July 13, 1926.

F. A. NYSTROM

AUTOMATIC RETAINING VALVE

Filed May 26, 1925

1,592,642

INVENTOR
Fritz Axel Nystrom
By ...... Taylor
Atty

Patented July 13, 1926.

1,592,642

UNITED STATES PATENT OFFICE.

FRITZ AXEL NYSTROM, OF MIDWAY, BRITISH COLUMBIA, CANADA.

AUTOMATIC RETAINING VALVE.

Application filed May 26, 1925. Serial No. 32,987.

My invention relates to improvements in automatic retaining valves, and the object of my invention is to provide a device of this character especially adapted for use on railway cars and locomotive tenders, although, however, it may be employed with equal facility for other analogous uses where retaining and release of pressure is required, and which enables great economy in maintenance and operation to be effected while at the same time it is characterized by the great simplicity of construction and is highly efficient and safe.

I attain this object by the construction illustrated in the accompanying drawings in which—

Similar figures of reference indicate similar parts throughout the several views.

Figures 1, 2:
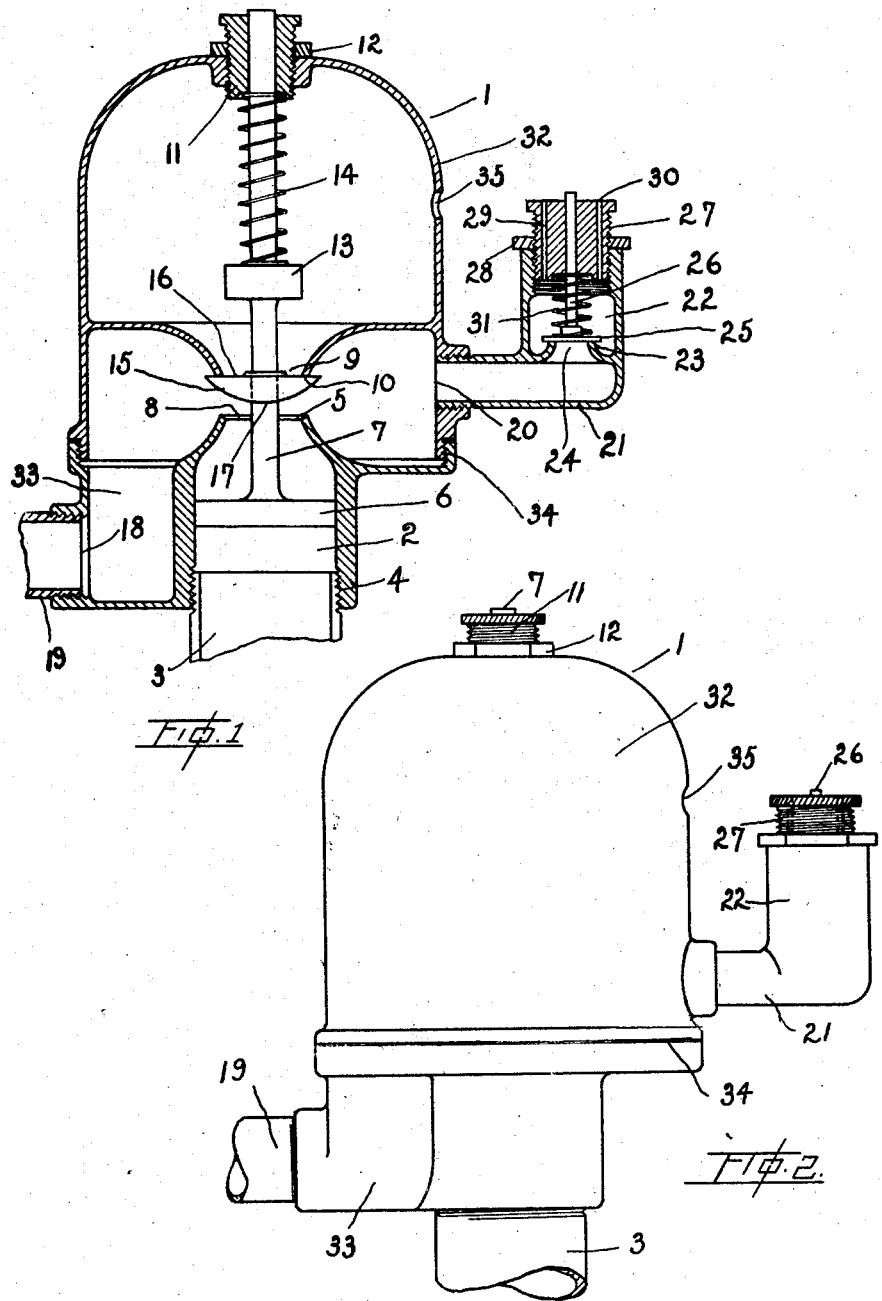
Fig. 1 is a sectional elevation of my device.
Fig. 2 is an outside view.

The device consists of a closed hood or chamber, indicated generally by the numeral 1, of suitable dimensions, in the lower end of which and concentric with it is provided a vertical cylindrical chamber 2 of less height and diameter than the chamber 1, which chamber 2 is open at both ends, its lower end being connected to a pipe connection 3 as at 4 while its upper end is provided with a valve seat 5. The chamber 2 forms a cylinder in which is disposed a piston 6 connected to a piston rod 7 which extends vertically and centrally through the bore 8 of the valve seat 5 and also the bore 9 of a seat 10 arranged concentrically a short distance above the seat 5, the piston rod 7 then projecting slidably through a vertically adjustable nut 11 mounted in the upper end of the chamber 1 capable of being locked in any vertically adjusted position by a lock nut 12, as shown. At a suitable point on the rod 7 is formed a collar 13 between which and the nut 11 extends a coil spring 14, and between the two valve seats 5 and 10 there is formed with or otherwise secured to the rod 7 a valve 15 capable of co-acting with either of the valve seats as the case may be, to open or close the same, as hereinafter described, its upper and lower faces being formed for the purpose as valve faces 16 and 17 respectively.

18 indicates an aperture in one side of the chamber close to the bottom thereof to which is connected the end of pipe 19 while 20 indicates an aperture in the opposite side of the chamber 1 substantially on a level with the space between the valve seats 5 and 10 from which aperture extends laterally a branch pipe 21 the outer end of which is enlarged and extended vertically to form a valve chest 22 in which is provided a valve seat 23 the bore 24 of which is normally closed by a valve 25 having a stem 26 extending vertically through a vertically adjustable nut 27 which is threaded into the end of the valve chest 22 to form the cover of the same and is capable of being locked in any adjusted position by a lock nut 28, which adjustable nut is provided with exhaust bores 29 and 30 extending vertically through it, and between the nut 27 and the valve 25 is disposed a coil spring 31.

The chamber 1 is formed into upper and lower parts 32 and 33 rspectively, the lower part 33 containing the cylinder 2 and valve seat 5, and both parts are detachably connected together by a screw connection, as indicated at 34 in Fig. 1, and in the wall of the upper part 32, at a point above the aperture 20, is provided an exhaust aperture 35.

The operation of the device may be briefly described, with reference generally to the connection of individual valves in their respective locations in the air line, it being understood that the spring 14 may be adjusted by means of the nut 11 to whatever pressure it is desired that the valve 15 shall operate at. Thus when the pressure in the chamber 2 on the underside of the piston 6 exceeds slightly that at which the spring 14 is set the valve 15, which normally closes valve seat 5, is raised to close the valve seat 10, whereupon the pressure through aperture 18, which it is desired to reduce to a given pressure, flows across under the valve seat 15 and through the aperture 20 into branch 21, forcing valve 25 off its seat 23 and exhausting through the bores 29 and 30 in nut 27 until it equalizes the pressure at which the spring 31 is set and this reduced pressure will be retained until the pressure in the cylinder 2 is reduced below the pressure at which the spring 14 is set, when the valve 15 will be forced down by the spring to seat again on the seat 5, and in this position the device does not function as a retaining valve, since the pressure through aperture 18 simply passes across above the valve 15 into the upper part of the chamber and exhausts into the atmosphere through aperture 35.

One of the important advantages of the device is that the operation may be entirely controlled by the engineer at will, in which case the aperture 18 is attached to the exhaust port of the triple valve and the cylinder 2 to the cylinder cap nut of the triple valve or any convenient part of the main air pipe of each car. When the retaining feature is not required the pressure in cylinder 2 under piston 6, which is controlled by the engineer through the main air pipe, is kept slightly below the pressure of the spring 14, say about 70 lbs., so that the valve 15 then closes the seat 5. When it is desired to bring the retaining feature into operation the pressure in cylinder 2 is raised above that of the spring 14, that is, above 70 lbs. in this case, thus forcing the piston 6 upwardly till the valve 15 closes the seat 10 so that the pressure flows under the valve 15 into branch 21 lifting and passing valve 25 and exhausting through bores 29 and 30 until the tension at which spring 31 is set forces valve 25 to reseat and retain the pressure at say 15 or 20 lbs., or as required. From this it will be seen that the operation of the valve may be entirely removed from the control of the brakemen and placed entirely in charge of the engineer so that a great saving of time in the operation of trains is thus rendered possible, as the time required for the manual operation of such valves individually by the brakemen as at present is saved and the necessity of the train standing still while this is done is entirely eliminated.

What I claim as my invention is:—

1. A retaining valve comprising a main chamber having a centrally apertured diaphragm dividing it into upper and lower chambers the lower one of which is provided with a pressure reducing and retaining device and a pressure inlet and the upper one with an exhaust outlet, a cylinder, the upper end of which is formed as a valve seat, extending into said lower chamber concentrically of said diaphragm aperture and is spaced therefrom, a spring pressed valve seated on said cylinder end valve seat, and a piston in said cylinder connected to said valve, pressure on the underside of which, greater than the spring pressure, forces the valve upwardly to close the diaphragm aperture.

2. A retaining valve comprising a main chamber having a centrally apertured diaphragm dividing it into upper and lower chambers the lower one of which is provided with a pressure reducing and retaining device and a pressure inlet and the upper one with an exhaust outlet, a cylinder, the upper end of which is formed as a valve seat, extending into said lower chamber concentrically of said diaphragm aperture and spaced therefrom, a valve adapted to co-act at its upper and lower faces respectively with the diaphragm aperture and the cylinder end valve seat to open or close the same, having a stem extending vertically through the diaphragm aperture and the upper end of the main chamber, said stem being extended into the cylinder and provided with a piston, and a tension spring mounted on the stem above the valve exerting downward pressure thereon.

3. A retaining valve comprising a main chamber having a centrally apertured diaphragm dividing it into upper and lower chambers the upper one of which is provided with an exhaust outlet and the lower one with a pressure inlet, a valve chest in communication with said lower chamber having a valve seat therein and a spring-pressed valve co-acting with said seat, the cover of said valve chest having exhaust bores, a cylinder the upper end of which is formed as a valve seat and extending into said lower chamber concentrically of said diaphragm aperture and spaced therefrom, a spring-pressed valve seated on said cylinder end valve seat, and a piston in said cylinder connected to said valve.

4. A retaining valve comprising a main chamber having a centrally apertured diaphragm dividing it into upper and lower chambers the upper one of which is provided with an exhaust outlet and a nut having a central bore threaded centrally into its upper end fitted with a lock nut, the lower one having a pressure inlet, a valve chest in communication with said lower chamber the cover of which is formed as a nut threaded into the upper end of said chest having a central bore and exhaust bores and fitted with a lock nut, a valve seat in said chest and a valve co-acting therewith having a stem extending through the central bore of the nut, a spring mounted on said stem between the valve and the nut, a cylinder the upper end of which is formed as a valve seat and extending into said lower chamber concentrically of the said diaphragm aperture and spaced therefrom, a valve adapted to co-act as to its upper and lower faces respectively with the diaphragm aperture or cylinder end valve seat to open or close the same having a stem extending vertically through the diaphragm aperture and the upper chamber nut bore provided with a collar intermediate its length, said stem being extended below the valve into the cylinder and provided with a piston, and a tension spring extending between the upper chamber nut and the stem collar.

Dated at Midway, B. C., this 9th day of May, 1925.

FRITZ AXEL NYSTROM.